United States Patent

[11] 3,625,302

| [72] | Inventor | Robert B. Lauck<br>Southfield, Mich. |
|---|---|---|
| [21] | Appl. No. | 823,787 |
| [22] | Filed | May 12, 1969 |
| [45] | Patented | Dec. 7, 1971 |
| [73] | Assignee | Eaton Yale & Towne Inc.<br>Cleveland, Ohio |

[54] HYDROSTATIC TRANSMISSION CONTROL
31 Claims, 11 Drawing Figs.

[52] U.S. Cl................................................ 180/6.48,
74/471 XY, 180/77 H
[51] Int. Cl........................................................ B62d 11/04
[50] Field of Search.......................................... 180/6.48,
6.5; 74/471 R, 471 XY, 77 H

[56] References Cited
UNITED STATES PATENTS
2,941,609   6/1960   Bowers et al. ................. 180/6.48

| 3,323,607 | 6/1967 | Futamata...................... | 74/471 XY |
| 3,431,993 | 3/1969 | Case............................. | 180/6.48 |
| 3,181,389 | 5/1965 | Richard....................... | 74/480 |

*Primary Examiner*—Benjamin Hersh
*Assistant Examiner*—John A. Pekar
*Attorney*—Yount & Tarolli ABSTRACT: An improved apparatus for controlling the operation of a plurality of hydrostatic transmissions includes a single-control member. The control member is connected with the hydrostatic transmissions by a mechanical linkage which enables the control member to be moved in a natural manner to control both forward and reverse movement of a vehicle driven by the hydrostatic transmissions. The mechanical linkage can be used with different types of control members, such as a joystick or a T-handle.

INVENTOR
ROBERT B. LAUCK
BY Yount and Tarolli
ATTORNEYS

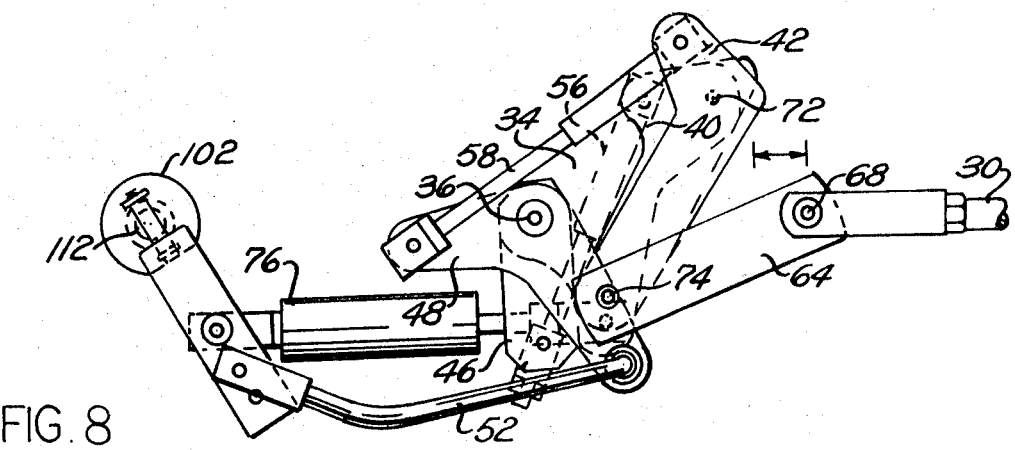
FIG. 8
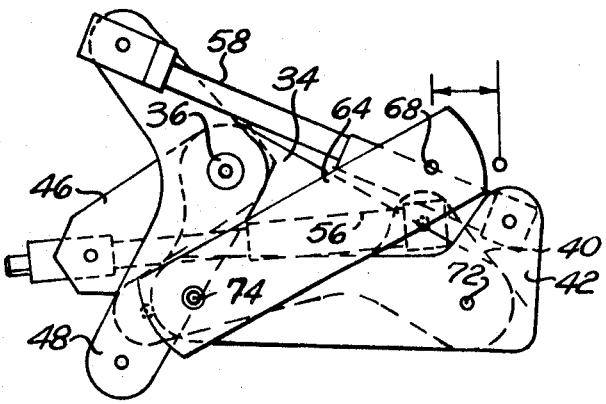
FIG. 9
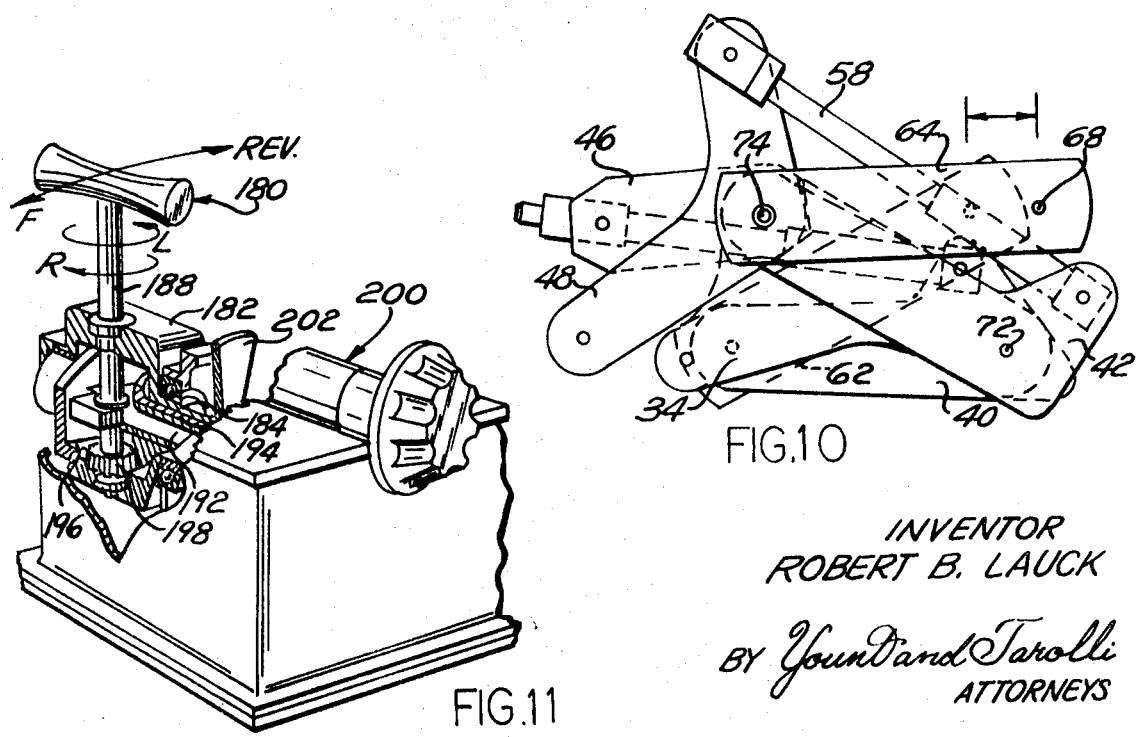
FIG. 10
FIG. 11
INVENTOR
ROBERT B. LAUCK
BY Yound and Tarolli
ATTORNEYS

HYDROSTATIC TRANSMISSION CONTROL This invention relates generally to a control system and more particularly to a control system for a plurality of hydrostatic transmissions.

A known vehicle-steering and speed control system includes a single member which is manually actuated to control the speed and direction of operation of a plurality of hydrostatic transmissions. This control member is connected with the hydrostatic transmissions my means of a mechanical linkage. To effect a turning of the vehicle toward the left while it is going forward, the control member is moved toward the operator's left. However to effect a turning of the vehicle toward the left while it is going backward, the control member must be moved toward the operator's right. The necessity of moving the control member toward the right to effect a left turn while the vehicle is going backward requires the operator to move the control member in a manner which is contrary to his natural instincts. This unnatural movement of the control member is necessitated by the inherent operation of known mechanical linkage arrangements for interconnecting the single control member and the hydrostatic transmissions.

Accordingly, it is an object of this invention to provide a new and improved mechanical linkage for operatively connecting a plurality of hydrostatic transmissions with a single-control member which is moved in a natural manner to control the direction and speed of forward and reverse movement of a vehicle.

Another object of this invention is to provide a new and improved mechanical linkage which is suitable for use with different types of control members, such as a joystick or a T-handle, to control operation of a plurality of hydrostatic transmissions and thereby vary the speed and direction of forward and reverse movement of a vehicle in a manner which corresponds directly to the direction of operation of the control member.

Another object of this invention is to provide a new and improved apparatus for controlling the operation of a plurality of hydrostatic transmissions including a single-control member which is operable forwardly or rearwardly from an initial position to actuate a mechanical linkage and thereby effect operation of the hydrostatic transmissions in either the forward or the reverse direction at a speed which is varied by varying the extent of operation of the control member, the control member being operable in a third direction after operation in either the forward or reverse direction to decrease the speed of operation of one hydrostatic transmission relative to another hydrostatic transmission.

Another object of this invention is to provide a new and improved apparatus as set forth in the next preceding object and wherein the control member is operable in a fourth direction after operation in either the forward or reverse direction to decrease the speed of the other hydrostatic transmission.

These and other objects and features of the invention will become more apparent upon a consideration of the following description taken in connection with the accompanying drawings wherein:

FIG. 3 is a fragmentary plan view further illustrating the structure of the mechanical linkage assembly of FIG. 2;

FIG. 4 is a plan view of a main actuator link or lever of the mechanical linkage assembly of FIGS. 2 and 3;

FIG. 5 is a plan view of a right actuator link or lever of the mechanical linkage assembly of FIGS. 2 and 3;

FIG. 8 is a schematic illustration of the mechanical linkage assembly in an actuated condition for effecting forward movement of the vehicle;

FIG. 9 is a schematic illustration, similar to FIG. 8, of the mechanical linkage assembly in an actuated condition for effecting reverse movement of the vehicle;

FIG. 10 is a schematic illustration, similar to FIG. 9, illustrating the mechanical linkage assembly in an actuated condition for effecting a reverse left turning of the vehicle; and FIG. 11 is an illustration of a second embodiment of the invention wherein the control member is a T-handle.

Figure 1:
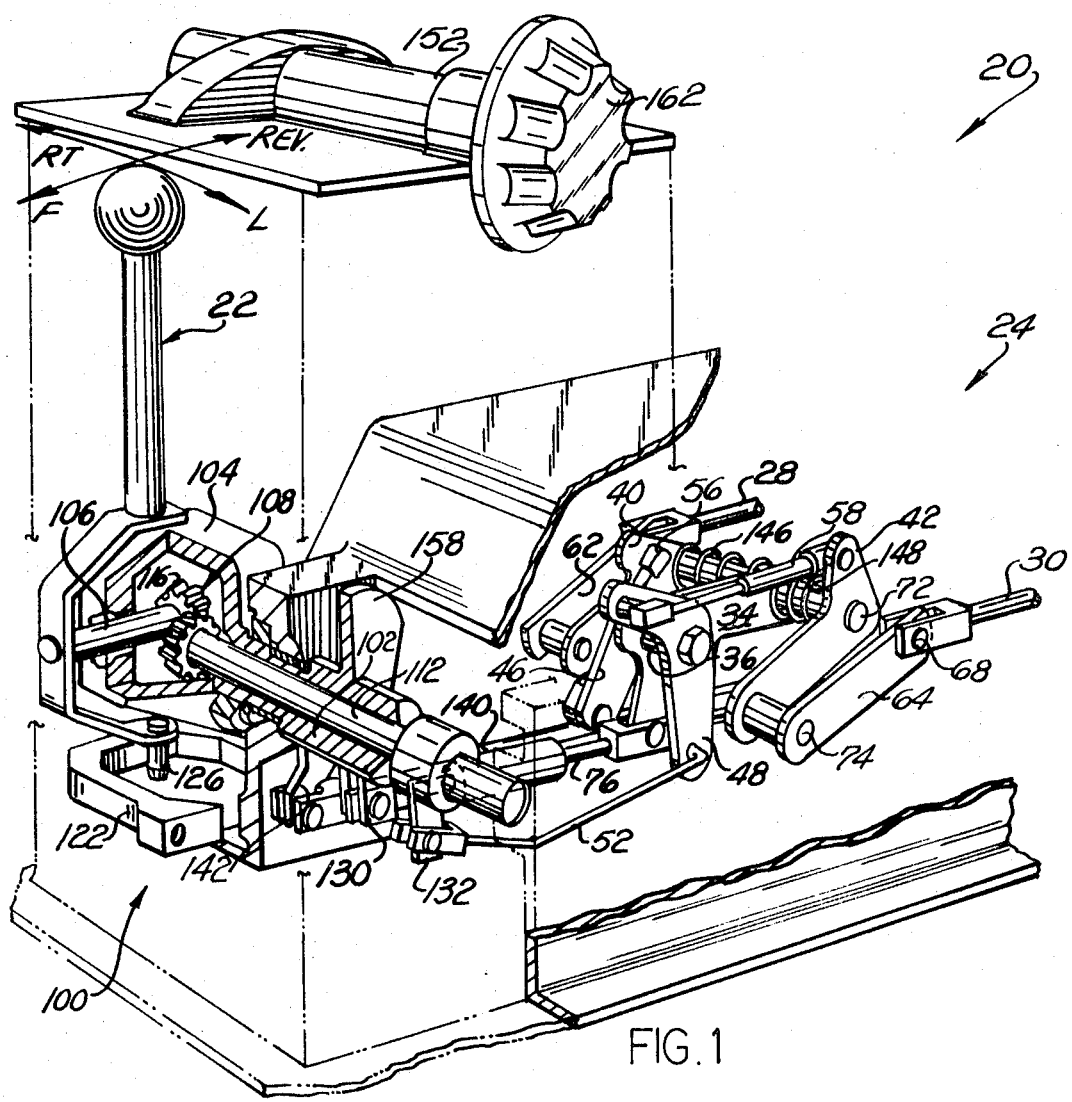
FIG. 1 is a schematic illustration of an assembly for controlling the operation of a plurality of hydrostatic transmissions for driving a vehicle.

The present invention provides an apparatus for controlling the operation of a plurality of hydrostatic transmission for driving a vehicle. The apparatus includes a single control member, such as a joystick or T-handle, which is connected with the hydrostatic transmissions by a mechanical linkage assembly. This mechanical linkage assembly effects operation of the hydrostatic transmissions to provide a natural relationship between operation of the control member and movement of a vehicle. Thus, when the control member is operated to the left the vehicle is turned to the left whether it is going forward or backward. Similarly, if a control member is operated toward the right, the vehicle is turned to the right whether it is going forward or backward.

A control assembly 20 (FIG. 1) is operable to control the operation of a pair of hydrostatic transmissions for driving a vehicle, such as a crawler or tractor. Each of the hydrostatic transmissions is associated with one of the tracks of the crawler in a known manner and is driven by a suitable source of power to effect movement of the vehicle in response to actuation of a single-control member 22. The control member or joystick is connected with the hydrostatic transmissions by a mechanical linkage assembly 24.

The mechanical linkage assembly 24 enables the control member 22 to be moved in a natural manner to control forward and reverse movement of the vehicle. Thus, to effect a forward and left-turning movement of the vehicle, the control member 22 is moved forwardly and to the operator's left. To effect rearward and left turning movement of the vehicle the control member 22 is moved rearwardly and to the operator's left. A right turn is effected in either the forward or reverse directions by moving the control member forwardly or rearwardly and to the right. The speed of movement of the vehicle in any given direction is controlled by varying the extent to which the control member 22 is operated in the given direction.

This direct correspondence between the direction of movement of the control member 22 and the direction of movement of the vehicle is provided for by the mechanical linkage assembly 24. The linkage assembly 24 is mechanical, that is it is formed by a plurality of mechanically interconnected links and is devoid of hydraulic and electrical components. These mechanically interconnected links include right and left connector rods or links 28 and 30. The right connector rod 28 is movable to control the direction and speed of operation of a right hydrostatic transmission, that is the hydrostatic transmission associated with the right track of the vehicle. Similarly, the left connector rod or link 30 is movable to control the speed and direction of operation of a left hydrostatic transmission, that is the hydrostatic transmission associated with the left track of the vehicle. Although the linkage assembly 24 is mechanical so that it has no hydraulic components, the connector rods 28 and 30 can effect operation of the hydrostatic transmissions through suitable control valves or servomotors in a manner illustrated in my copending application Ser. No. 716,204, filed on Mar. 26, 1968 and entitled Hydrostatic Transmission Control System.

Upon straight forward movement of the control member 22, the mechanical linkage assembly 24 moves the connector rods 28 and 30 rearwardly for the same distance to effect operation of the hydrostatic transmissions at the same speed in the forward direction. Movement of the control member or joystick 22 backwardly or in a reverse direction moves the connector rods 28 and 30 forwardly for substantially the same distance to effect operation of the hydrostatic transmissions at the same speed in the reverse direction. The extent to which the connector rods 28 and 30 are moved and the speed of operation of a hydrostatic transmissions, is a direct function of the extent of movement with the control member 22 in either the forward or reverse direction.

The mechanical linkage assembly 24 includes a main actuator lever or link 34 (see FIG. 1–4) which is pivoted about a mounting 36 to effect equal movement of right and left actuator links or levers 40 and 42 about the pivot mounting 36. This movement of the actuator links 40 and 42 is transmitted to the connector rods 28 and 30 to move them through the same distance and effect operation of the hydrostatic transmission at the same speed and in the same direction. The right actuator link 40 (FIG. 5) is pivotal relative to the main actuator lever 34 to decrease the speed of operation of the right hydrostatic transmission relative to the left hydrostatic transmission and thereby effect a rightward turning movement of the vehicle. Similarly, the left actuator link 42 (FIG. 1) is pivotal relative to the main actuator link 34 to decrease the speed of operation of the left hydrostatic transmission relative to the right hydrostatic transmission to thereby effect a leftward turning movement of the vehicle. This pivoting movement of the right and left actuator links 40 and 42 relative to the main actuator link 34 is effected by pivoting right and left-turn links 46 and 48 that are fixedly interconnected on the common mounting 36. The turn links 46 and 48 are pivoted together relative to the main actuator link 34 by means of an operator rod 52 which is pivotally connected to the left-turn link 48.

Figure 6:
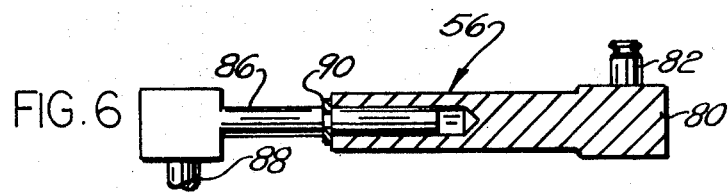
FIG. 6 is a sectional view of a slip-type coupling or link of the mechanical linkage assembly.
Figure 7:
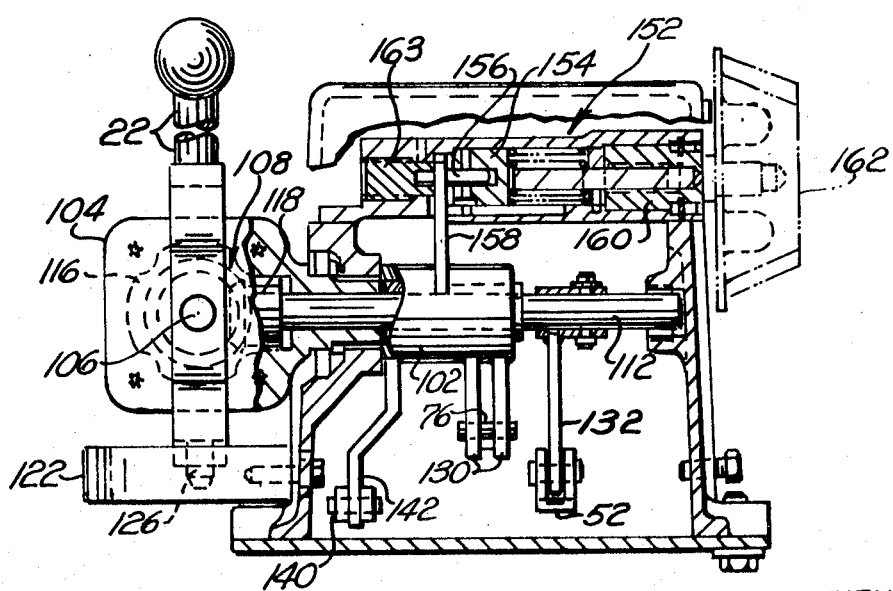
FIG. 7 is an elevational sectional view, taken generally along the line 7—7 of FIG. 2, illustrating the relationship o the control member to a connector or drive assembly for operatively connecting the control member with the mechanical linkage assembly.

When the control member 22 is operated toward the right, the right actuator link 40 is actuated through a right slip link or coupling 56 (FIG. 6) which is pivotally connected between the right-turn link 46 and right actuator link. Similarly, the left-turn link 48 is connected with the left actuator link 42 by a left slip link or coupling 58 (FIG. 1) which is pivotally connected to the left-turn link and left actuator link. Movement of the actuator links 40 and 42 under the influence of the associated slip links 56 and 58 is translated to the connector rods 28 and 30 by connector links 62 and 64.

Figure 2:
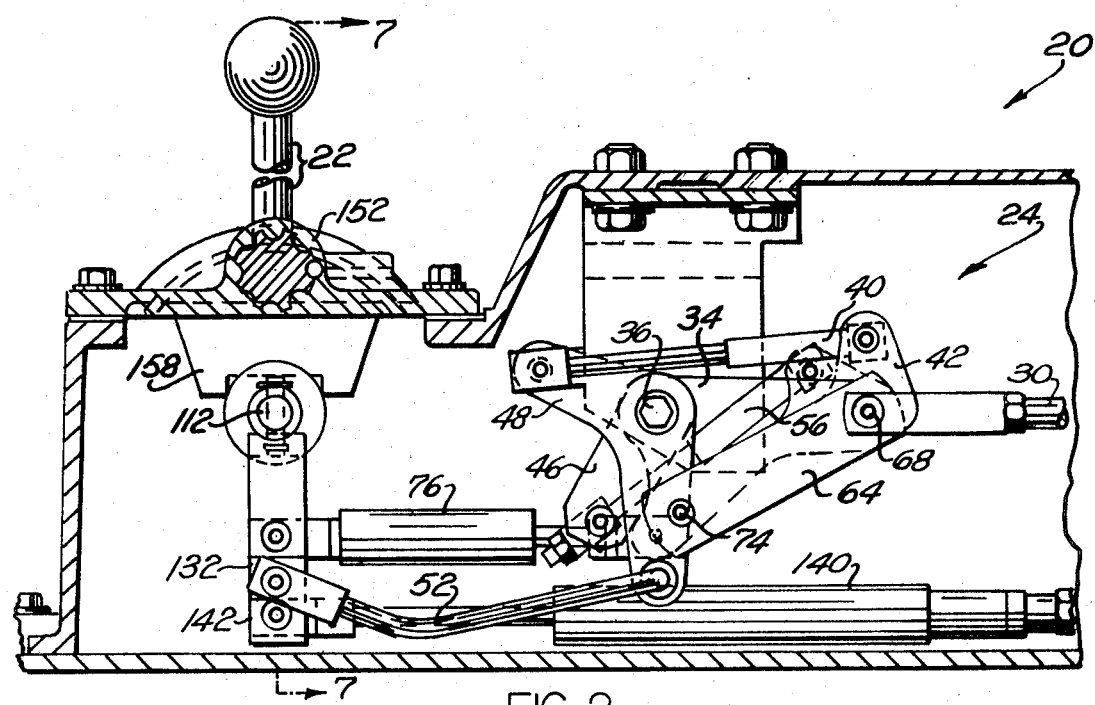
FIG. 2 is a sectional view of the control assembly of FIG. 1 illustrating the relationship between a manually actuatable control member and a mechanical linkage assembly.

Upon movement of the control member 22 toward the left, the operator rod 52 pivots the interconnected turn links 46 and 48 in a clockwise direction as viewed in FIGS. 1 and 2. This pivotal movement of the left turn link 48 causes the left slip link or coupling 58 to pivot the left actuator link 42 in a generally clockwise direction relative to the main actuator link 34. When the control member 22 is moved to the left from the neutral or initial position illustrated in FIGS. 1 and 2, a pivot connection 68 between the connector rod 30 and the connector link 64 is coaxial with the pivot mounting 72 of the left actuator link 42 on the main actuator link 34. This results in the left actuator link 42 and connector link 64 merely spinning about their common axis without effecting movement of the connector rod 30 upon leftward movement of the control member from its initial position. Therefore, the left hydrostatic transmission remains in its neutral condition. Similarly, when the control member 22 is moved to the right from the neutral or initial position, a pivot connection between the connector rod 28 and the connector link 62 is coaxial with the pivot mounting for the right actuator link 40. Therefore, the connector link 28 is not moved in response to this movement of the actuator link 40 and the right hydrostatic transmission remains in its neutral condition.

Movement of the control member 22 to the right or the left is effective to turn the vehicle when the control member has previously been moved either forwardly or rearwardly from its initial position. When the control member 22 is moved forwardly from the initial position, an operator rod 76 pivots the main actuator link 34 in a counterclockwise direction from the initial position of FIG. 1 so that the main actuator link assumes an orientation similar to that shown in FIG. 8. This pivotal movement of the main actuator link 34 pivots the left actuator link 42 in a counterclockwise direction about the pivot mounting 72 and the pivot connection 74 moves rearwardly of the initial position shown in FIG. 1. This causes the pivot connection 68 between the connector rod 30 and connector link 64 to move rearwardly, through the distance indicated by the arrow in FIG. 8, to thereby operate a suitable servomechanism to effect forward operation of the left hydrostatic transmission. Of course, the speed at which the left hydrostatic transmission operates in the forward direction varies as a function of the extent of movement of the control member 22 in the forward direction from the initial position of FIG. 1. Since it has been assumed that the control member 22 was moved straight forwardly, the right connector rod 28 is moved rearwardly by operation of the right actuator link 40 and connector link 62 to thereby effect operation of the right hydrostatic transmission in the forward direction.

Movement of the control member 22 toward the left, after it has been moved forwardly from the initial position of FIG. 1, actuates the mechanical linkage 24 to decrease the speed of operation of the left hydrostatic transmission. If the control member is moved as far as possible toward the left, the mechanical linkage 24 effects operation of the left hydrostatic transmission in the reverse direction at a speed which is equal to the speed at which the right hydrostatic transmission is operated in the forward direction. This results in a sharp turning or spinning of the vehicle toward the left.

When the control member 22 is moved toward the left from the forward operated position of FIG. 8, the operator rod 52 pivots the turn link 48 in a clockwise direction as viewed in FIG. 1. This movement of the turn link 48 is transmitted to the left actuator link 42 by the slip link or coupling 58 which effects pivotal rotation of the left actuator link 42 in a clockwise direction as viewed in FIG. 8 about the pivot connection 72. This pivoting of the left actuator link 42 moves the pivot connection 74 upwardly and forwardly from the forward operated position of FIG. 8 to thereby move the pivot connection 68 forwardly toward the neutral or initial condition of FIG. 1. Of course, this results in the speed of the left hydrostatic transmission being decreased to cause a leftward turning of the vehicle.

If the control member 22 is moved or operated toward the left for half of its maximum leftward stroke, the pivot connection 68 is moved to the initial position illustrated in FIG. 2. The left hydrostatic transmission is then deswashed to its neutral condition so that it is ineffective to transmit power to the left track of the vehicle. The right track then causes the vehicle to turn in a hard left turn. Continued movement of the control member 22 toward the left moves the pivot connection 68 forwardly of the initial position of FIGS. 1 and 2 to thereby effect operation of the left hydrostatic transmission in the reverse direction and a spinning of the vehicle toward the left. When the control member 22 has been operated through its maximum leftward stroke, the left hydrostatic transmission operates in the reverse direction at the same speed at which the right hydrostatic transmission operates in the forward direction.

Although the left actuator link 42 was pivoted relative to the main actuator link 34 in response to the leftward movement of the control member 22, the right actuator link 40 remained stationary relative to the main actuator link 34. This is because the turn link 46 is connected with the right actuator link 40 by the slip link or coupling 56. The slip link 56 (FIG. 6) and includes a body or block end 80 which is pivotally connected by a pin 82 to the right actuator link 40. A rod end 86 of the slip link 56 is pivotally connected by a pin 88 to the turn link 46. A stop ring 90 is mounted on the rod 86 to enable the slip link 56 to push or pivot the right actuator link in a clockwise direction as viewed in FIG. 1 when the slip link 56 is moved away from the pivot connection between the slip link and the right actuator link 40. However when the pivot connection between the slip link 56 and the turn link 46 is moved away from the pivot connection between the slip link and the right actuator link 40, the rod 86 merely slides outwardly relative to the block 80 and the slip link 56 is expanded without effecting movement of the right actuator link 40.

When the control member 22 is moved toward the left, the interconnected turn links 46 and 48 are both pivoted in a clockwise direction. However, the clockwise pivoting movement of the turn link 46 effects an expanding of the slip link 56 without pivoting the right actuator link. Therefore, when the control member 22 is moved toward the left, the slip link 56 effectively absorbs the movement of the turn link 46 so that the right connector rod 28 remains stationary and right hydrostatic transmission continues to operate at its previous speed. The left slip link 58 has the same construction as the right slip link 56. The slip link 58 is effective to transmit motion from the turn link 48 to the left actuator link 42 upon leftward actuation of the control member 22. However, the slip link 58 expands upon rightward movement of the control member 22 so that the left hydrostatic transmission is uneffected by this movement.

Operation of a control member 22 in the reverse direction actuates the mechanical linkage 24 in a generally similar but opposite manner to that in which it is actuated by forward movement of the control member 22. Thus, upon reverse movement of the control member 22 the mechanical linkage 24 is actuated to move the right and left connector rods 28 and 30 equal distances in the forward direction to effect operation of the hydrostatic transmissions in the reverse direction at the same speed. Movement of the control member 22 is the reverse direction pivots the main actuator link 34 in a clockwise direction about the pivot connection 36 from the initial position shown in FIG. 2 to the reverse actuated position shown in FIG. 9. The reverse or rearward movement of the control member 22 also pivots the turn links 46 and 48 in a clockwise direction from their initial positions. The pivotal movement of the left-turn link is transmitted to the left actuator link 42 by the left slip link 58. This pivots the left actuator link 42 about the pivot connection 72 in a generally clockwise direction from the initial position of FIG. 1.

The combined effect of the pivotal movement of the main actuator link 34 and the left actuator link 42 moves the pivotal connection 74 on the connector link 64 forwardly. Therefore, the pivot connection 68 between the connector rod 30 and the connector link 64 is moved forwardly, through the distance indicated by the arrow in FIG. 9, to effect actuation of the left hydrostatic transmission in the reverse direction. Similarly, the right actuator link 40 is pivoted downwardly and in a generally clockwise direction by the combined effect of the pivoting movement of the main actuator link 34 and the turn link 46. Therefore, the pivot connection between right connector link 62 and the right connector rod 28 moves forwardly. Both of the connector rods 28 and 30 are moved through the same distance so that the left and right hydrostatic transmissions are operated in the reverse direction at the same speed to move the vehicle straight rearwardly.

Actuation of the control member 22 to effect a left turn while the vehicle is moving rearwardly operates the mechanical linkage 24 to move the pivot connection 68 from the reverse actuated condition of FIG. 9 toward the neutral position of FIG. 2 to thereby effect a decrease in the speed of the left hydrostatic transmission. If the control member is moved as far to the left as possible, the pivot connection 68 moves through the initial or neutral position (shown in FIG. 10) toward the forward actuated position of FIG. 8. This effects operation of the left hydrostatic transmission in the forward direction at a speed which is equal to the speed at which the right hydrostatic transmission is operated in a reverse direction to thereby spin the vehicle upon its central axis.

Upon operation of the control member 22 toward the left, the turn link 48 is pivoted in a clockwise direction by the operator rod 52. The slip link 58 then pivots the left actuator link 42 clockwise direction from the position shown in FIG. 9 to the position shown in FIG. 10. As the actuator link 42 pivots in a clockwise direction, the pivot connection 68 is moved rearwardly from the position in FIG. 9 toward the position shown in FIG. 10. When the pivot connection reaches the position shown in FIG. 10 it is in the neutral or initial position of FIG. 2. Therefore, the left hydrostatic transmission is actuated to a neutral condition by the connector rod 30. Continued leftward movement of the control member 22 causes the connector rod 30 to actuate the left hydrostatic transmission to a forward operating condition.

The right turn link 46 is also pivoted in a clockwise direction in response to the leftward movement of the control member 22. However, the slip link 56 is expanded in the manner previously explained and the right actuator lever 40 remains stationary relative to the main actuator link 34. Therefore, the right connector rod 28 is not moved in response to the leftward movement of the control member 22 and the right hydrostatic transmission continues to operate at a constant speed in the reverse direction.

If the control member 22 is moved toward the right while the vehicle is moving in a reverse direction, the mechanical linkage 24 operates the right connector rod 28 to decrease the speed of a right hydrostatic transmission while the left hydrostatic transmission continues to operate at a constant speed in the reverse direction. When the control member 22 is moved toward the right, the turn links 46 and 48 are pivoted in a counterclockwise direction. The counterclockwise pivoting movement of the right turn link 46 is transmitted by the right slip link 56 to the right actuator lever 40 which is pivoted in a clockwise direction from the position shown in FIG. 9. This moves the pivot connection between the connector link 62 and right connector rod 28 rearwardly to thereby effect a decrease in the speed of the right hydrostatic transmission. When the control member is moved to the right as far as possible, the connector rod 28 is moved through its initial position to effect operation of the right hydrostatic transmission in a forward direction at a speed which is equal to the speed at which the left hydrostatic transmission is operating in the reverse direction. Of course, the counterclockwise pivoting movement of the turn link 48 causes an expansion of the left slip link 58 so that the left actuator link is not pivoted relative to the main actuator link 34 and the speed of the left hydrostatic transmission remains substantially constant.

The control member or joystick 22 actuates the mechanical linkage 24 through a connector or drive assembly 100 (FIG. 1). The connector or drive assembly 100 includes an outer actuator shaft 102 having a cage or carrier 104 on which the control member 22 is pivotally mounted by means of a support rod or shaft 106. A gear assembly 108 connects the control member 22 with an inner actuator shaft 112. Upon movement of the control member 22 toward the right or the left, the inner actuator shaft 112 is rotated by the gear assembly 108. The gear assembly 108 includes a gear 116 which is fixedly connected to the support shaft 106 and a gear 118 which is fixedly connected to the inner actuator shaft 112. Upon movement of the control member 22 toward the left from the initial position shown in FIG. 1, the gear 116 is rotated toward the left to effect generally clockwise rotation of the gear 118 and actuator shaft 112. Similarly, when the control member is moved toward the right the gear 116 is rotated toward the right and effects counterclockwise rotation of the actuator shaft 112.

The actuator shafts 102 and 112 are both rotated by movement of the control member 22 in either the forward or reverse direction. Thus, if the control member 22 is moved forwardly the cage 104 is rotated in a generally counterclockwise direction as viewed in FIG. 1. The gears 116 and 118 do not rotate relative to each other so that the shaft 112 is also rotated in a counterclockwise direction. Similarly, when the control member 22 is moved in the reverse direction, the actuator shafts 102 and 112 are rotated in a clockwise direction. Movement of the actuator member 22 from the initial position is limited by a bracket 122 which is engaged by a stop pin 126 connected to the control member 22. The rotational movement of the actuator shafts 102 and 112 is transmitted by the operator rods 52 and 76 to the mechanical linkage 24. Thus, the outer actuator shaft 102 has a downwardly projecting actuator lever 130 which is pivotally connected with the operator rod 76. Similarly, a downwardly projecting actuator lever 132 is fixedly secured to the inner actuator shaft 112 and is pivotally connected with the operator rod 52.

From the foregoing description, it is apparent that when the control member 22 is moved forwardly the actuator levers 130 and 132 are pivoted in a generally clockwise direction as viewed in FIG. 1. This moves the operator rods 76 and 52 rearwardly and effects a pivoting movement of the main actuator link 34 and turn links 46 and 48 in a counterclockwise direction to the forward actuated position of FIG. 8. If the control member 22 is then moved toward the left, the gear 116 drives the gear 118 in a generally clockwise direction as viewed in FIG. 1 to pivot the turn links 46 and 48. Since the control member 22 is being pivoted about the longitudinal axis of the support shaft 106 as it is moved toward the left, the carrier or cage 104 is not pivoted about the longitudinal axis of the actuator shaft 102. Therefore, the actuator lever 130 remains stationary and the main actuator link 34 stays in the forward operated position to which it had been previously actuated by forward movement of the control member 22. Of course, rightward movement of the control member 22 results in the gear 118 being driven in a counterclockwise direction by the gear 116 to pivot the actuator lever 132 in a counterclockwise direction. This moves the turn links 46 and 48 in a counterclockwise direction and effects a right-turning of the vehicle in the manner previously explained.

The outer actuator shaft 102 is biased toward an initial or neutral position by a double-acting spring box 140 is pivotally connected at one end to an actuator lever 142 which extends downwardly from the outer shaft 102 and is connected to a fixed member at its opposite end. Therefore when the control member 22 is moved in either the forward or reverse directions and released, the spring box 140 returns the control member to the initial or neutral position. A pair of biasing springs 146 and 148 (FIGS. 1 and 3) are connected at their inner ends to the main actuator link 34 and at their outer ends to the right and left actuator links 40 and 42 to bias the actuator links to their initial positions. Therefore, if the control member 22 is moved either the right or the left and released, the actuator springs 146 and 148 operate through the mechanical linkage 24 to return the control member 22 to the initial position.

A retaining assembly 152 is selectively operable to maintain the control member 22 in a position corresponding to a desired speed in the forward or reverse directions. The retainer assembly 152 includes a pressure head 154 having the friction member 156 for engaging a sector 158 which is fixedly mounted on the outer actuator shaft 102 (See FIG. 1). The opposite end of the pressure head 154 is mounted in threaded engagement with a body 160. The body 160 is fixedly connected to an actuator knob 162 so that rotation of the knob 162 moves the pressure head 154 axially relative to the sector 158.

When the control member 22 has been operated to a position corresponding to a desired speed in either the forward or reverse directions, the knob 162 is rotated to press the friction member 156 against the sector 158. This presses the sector 158 against a friction pad 163 to hold the outer actuator shaft 102 and the control member 22 against pivotal movement back to the initial condition under the influence of the spring box 140. When it is desired to move the control member 22 to vary the speed of the vehicle, the knob 162 is rotated to move the pressure head 154 axially away from the sector 158 so that the friction member 156 no longer presses the sector against the friction pad 163.

In the specific preferred embodiment of the invention illustrated in FIGS. 1 through 7 the control member 22 is a joystick which is rotated about one axis, i.e. the longitudinal axis of the actuator shafts 102 and 112, to vary the speed of operation of the hydrostatic transmissions in the forward and reverse directions. The joystick 22 is rotated about a second axis, i.e. the longitudinal axis of the support shaft 206, to decrease the speed of one of the hydrostatic transmissions relative to the other and effect a turning of the vehicle. The mechanical linkage 24 effects the operation of the hydrostatic transmission so as to enable the control member 22 to be moved in a natural manner to control both the speed and direction of movement of the vehicle.

In the embodiment of the invention illustrated in FIG. 11, the control member takes the form of a T-handle 180 which is rotatably mounted on a carrier or cage 182. The cage 182 is connected to an outer actuator shaft 184 in much the same manner as in which the carrier or cage 104 is connected with the outer actuator shaft 102. Upon forward or reverse movement of the T-handle, that is in the direction indicated in the arrows in FIG. 11, the outer actuator shaft 184 is rotated to effect operation of a mechanical linkage to vary the speed of operation of a pair of hydrostatic transmissions in the same way as previously explained in connection with the mechanical linkage 24.

The T-handle 180 is rotated to either the right or to the left to effect a turning of the vehicle by decreasing the speed of one of the hydrostatic transmissions relative to the other. Thus if the T-handle 180 is rotated to the right about the longitudinal axis of the stem or body portion 188 of the T-handle, the associated mechanical control linkage is operated to decrease the speed of the right hydrostatic transmission and effect a right turning of the vehicle in either a forward or a reverse direction. Similarly if the T-handle 180 is rotated toward the left about its longitudinal axis the speed of operation of the left hydrostatic transmission is decreased to turn the vehicle toward the left. When the T-handle 180 is in the initial or neutral condition and is operated to either the right or left, the T-handle is ineffective to vary the speed of either of the hydrostatic transmissions. This is because the associated mechanical linkage operates in the same manner as the mechanical linkage 24 and is ineffective to actuate the hydrostatic transmissions.

The T-handle 180, like the joystick 22, is moved in a natural manner to control both the speed and direction of movement of a vehicle. The T-handle 180 is mounted on a support shaft 192 which extends through an inner actuator shaft 194. A gear sector or segment 196 is connected to the outer end of the inner actuator shaft 194 and is rotated about the longitudinal axis of the inner actuator shaft by a pinion gear 198 which is fixedly connected with the stem 188 of the T-handle 180. Upon rotation of the T-handle 180 to either the right or the left, the gear 198 drives the gear segment 196 to rotate the inner actuator shaft about its longitudinal axis in much the same manner as in which the inner actuator shaft 112 is rotated about its longitudinal axis by the gear assembly 108. A retainer assembly 200 of the same construction as the retainer assembly 152, is operable to engage a sector 202 to retain the T-handle 180 against movement from a selected forward or reverse operated condition in the manner previously explained.

In view of the foregoing description, it can be seen that the present invention provides a mechanical linkage 24 which can be actuated by a single control member, i.e. either the joystick 22 or T-handle 180, to control the direction and speed of forward and reverse operation of a plurality of hydrostatic transmission in a natural manner. To provide for this operation of the hydrostatic transmissions, the control linkage includes a main actuator link 34 which is operated from an initial position to effect either forward or reverse operation of the hydrostatic transmissions at a speed which is a function of the extent of movement of the main actuator link from the initial position. Right and left actuator links 40 and 42 are mounted on the main actuator link 34 and are operable in response to right or left operation of the control member to decrease the speed of the hydrostatic transmission associated with the direction in which the control member is operated. Thus, the control member is operated to the right and right actuator link 40 is operated to decrease the speed of the right hydrostatic transmission and effect a turning movement of the vehicle toward the right. Similarly, if the control member is operated to the left the left actuator link 42 is operated to decrease the speed of the left hydrostatic transmission and effect a turning movement of the vehicle toward the left. If the control member is operated to either the left or right while in its neutral or initial position, the mechanical linkage 24 is ineffective to effect operation of hydrostatic transmissions from the neutral condition in which they are incapable of transmitting power to the tracks of the vehicle.

The following is claimed:

1. Apparatus for controlling the operation of a plurality of hydrostatic transmissions, said apparatus comprising a single-control member movable in a plurality of directions from an initial position for controlling the speed and direction of operation of said hydrostatic transmissions and for varying the speed of operation of said hydrostatic transmissions relative to each other, and linkage means for connecting said control member to said hydrostatic transmissions in such a manner that movement of said control member in either one of two lateral directions relative to said initial position is ineffective to vary the operation of said hydrostatic transmissions, said linkage means comprising, first and second actuator links mounted for pivotal movement about a common axis, first and second connector rods pivotally connected to said first and second actuator links respectively for actuation thereby upon movement thereof, the pivotal connection between said first actuator link and said first connector rod and said second actuator link and said second connector rod lying on said common axis when said control member is disposed in either lateral direction from said initial position.

2. Apparatus as set forth in claim 1 wherein at least one of said actuator links is movable about a first axis in response to movement of said control member in any one of said plurality of directions to thereby effect a variation in the operation of one of said hydrostatic transmissions, said actuator link being movable about said common axis in response to movement of said control member in either one of said two lateral directions from said initial position without varying the operation of said one hydrostatic transmission.

3. Apparatus as set forth in claim 2 wherein the other actuator link is movable about a first axis in response to movement of said control member in any one of said plurality of directions to thereby effect a variation in the operation of another of said hydrostatic transmissions, said other actuator link being movable about said common axis in response to movement of said control member in either one of said two directions from said initial position without varying the operation of said other hydrostatic transmission.

4. Apparatus as set forth in claim 3 wherein said first axis about which said actuator links rotate are coaxial.

5. Apparatus as set forth in claim 1 wherein movement of said control member in a first one of said plurality of directions effects operation of said hydrostatic transmissions at substantially the same speed in one direction, said control member being movable in a second one of said plurality of directions to effect operation of said hydrostatic transmissions at substantially the same speed in another direction opposite from said one direction, said control member being movable in a third one of said plurality of directions which is lateral to a path of movement of said control member in said first and second directions to effect operation of one of said hydrostatic transmissions at a greater speed in said one direction than the speed at which another of said hydrostatic transmissions is operated in said one direction, and said control member being movable in a fourth one of said plurality of directions which is lateral of said path of movement of said control member to effect operation of said one hydrostatic transmission at a greater speed in said other direction than the speed at which another of said hydrostatic transmissions is operated in said one direction.

6. Apparatus as set forth in claim 1 further including drive means for actuating said linkage means in response to movement of said control member in any one of said plurality of directions and in either of said two lateral directions.

7. Apparatus as set forth in claim 1 further including gear means operatively interconnecting said control member and said linkage means for actuating said linkage means in response to movement of said control member in any one of said plurality of directions and in either of said two lateral directions.

8. Apparatus set forth in claim 1 wherein said control member is movable in said plurality of directions from said initial position to a plurality of operating positions corresponding to various speeds and directions of operation of said hydrostatic transmissions, said control member being movable in at least said two of said lateral directions from any one of said operating positions to vary the speed of at least one of said hydrostatic transmissions relative to another of said hydrostatic transmissions.

9. Apparatus as set forth in claim 8 further including selectively actuatable retaining means for retaining said control member against movement in any one of a plurality of directions from a selected one of said operating positions while allowing said control member to move in at least one of said two lateral directions from said selected one of said operating positions.

10. Apparatus for controlling the operation of a plurality of hydrostatic transmissions, said apparatus comprising a single-control member movable in a plurality of directions from an initial position for controlling the speed and direction of operation of said hydrostatic transmissions and for varying the speed of operation of said hydrostatic transmissions relative to each other, and linkage means for connecting said control member to said hydrostatic transmissions in such a manner that movement of said control member in either one of two directions relative to said initial position is ineffective to vary the operation of said hydrostatic transmissions, said linkage means including first actuator means for contemporaneously effecting substantially equal variations in the operating speed of each of said hydrostatic transmissions in response to movement of said control member, second actuator means for effecting variations in the operating speed of one of said hydrostatic transmissions without effecting corresponding variations in the speed of another of said plurality of hydrostatic transmissions, and third actuator means for effecting variations in the operating speed of said other hydrostatic transmission without effecting corresponding variations in the speed of said one hydrostatic transmission.

11. Apparatus as set forth in claim 10 wherein said second actuator means is actuated in response to movement of said control member in one of said two directions and said third actuator means is actuated in response to movement of said control member in the other of said two directions.

12. Apparatus as set forth in claim 10 wherein said linkage means includes operator means for effecting operation of said second and third actuator means, said second actuator means includes a first link operatively connected to said one of said hydrostatic transmissions and first coupling means operatively interconnecting said operator means and said first link for transmitting forces from said drive means to said first link only in response to movement of said control member in one of said two directions, said third actuator means including a second link operatively connected to said other of said hydrostatic transmissions and second coupling means operatively interconnecting said operator means and said second link for transmitting force from said drive means to said second link only in response to movement of said control member in the other of said two directions.

13. Apparatus as set forth in claim 10 further including selectively actuatable retaining means for retaining said first actuating means in an operating position corresponding to selected operating speeds for each of said hydrostatic transmissions while allowing said second and third actuator means to be operated to vary the speeds of operation of said hydrostatic transmissions relative to each other and the selected operating speeds.

14. Apparatus for controlling the operation of a plurality of hydrostatic transmissions, said apparatus comprising a single control member operable in a plurality of directions relative to an initial position for controlling the speed and direction of operation of said hydrostatic transmissions, and mechanical linkage means comprising a plurality of mechanically interconnected links for operatively interconnecting said control member and said hydrostatic transmissions, said mechanical linkage means being responsive to operation of said control member in a first direction from said initial position to effect operation of said hydrostatic transmissions in a forward direction at substantially the same speed which is variable by varying the extent of operation of said control member in the first direction, said mechanical linkage means being responsive to operation of said control member in a second direction from said initial position to effect operation of said hydrostatic transmissions in a reverse direction at substantially the same speed which is variable by varying the extent of operation of said control member in the second direction, said mechanical linkage means being responsive to operation of said control member in a third direction after operation of said control member in said first direction from said initial position to effect a decrease in the speed of operation of one of said hydrostatic transmissions relative to another of said hydrostatic transmissions, said mechanical linkage means being responsive to operation of said control member in said third direction after operation of said control member in said second direction from said initial position to effect a decrease in the speed of operation of said one of said hydrostatic transmissions relative to said other of said hydrostatic transmissions, said linkage means comprising first and second actuator links mounted for pivotal movement about a common axis, first and second connector rods pivotally connected to said first and second actuator links respectively for actuation thereby upon movement thereof, the pivotal connection between said first actuator link and said first connector rod and said second actuator link and said second connector rod lying on said common axis when said control member is disposed in said third direction from said initial position.

15. Apparatus as set forth in claim 14 wherein said control member is operated in said first and second directions by rotating said control member about a first axis and said control member is operated in said third direction by rotating said control member about a second axis extending transversely to said first axis.

16. Apparatus as set forth in claim 14 wherein said mechanical linkage means is responsive to operation of said control member in a fourth direction opposite to said third direction after operation of said control member in said first direction from said initial position to effect a decrease in the speed of operation of said other hydrostatic transmission relative to said one hydrostatic transmission, said mechanical linkage means being responsive to operation of said control member in said fourth direction after operation of said control member in said second direction from said initial position to effect a decrease in the speed of operation of said other hydrostatic transmission relative to said one hydrostatic transmission.

17. Apparatus as set forth in claim 16 wherein said hydrostatic transmissions are ineffective for transmitting power when said control member is in said initial position, said mechanical linkage means being ineffective to change the speed of operation of said hydrostatic transmissions relative to each other in response to operation of said control member in either said third or said fourth direction when said control member is in said initial position.

18. Apparatus as set forth in claim 16 further including a plurality of gears operatively connecting said control member with said mechanical linkage means, said gears being retained against rotation relative to each other while being rotated about a the same axis upon operation of said control member in said first or said second direction, said gears being rotated relative to each other upon operation of said control member in either said third or said fourth direction to effect a change in speed of one of said hydrostatic transmissions relative to the other.

19. Apparatus for controlling the operation of a plurality of hydrostatic transmissions, said apparatus comprising a single-control member operable in a plurality of directions relative to an initial position for controlling the speed and direction of operation of said hydrostatic transmissions, and mechanical linkage means comprising a plurality of mechanically interconnected links for operatively interconnecting said control member and said hydrostatic transmissions, said mechanically interconnected links including a first actuator link which is operated in response to operation of said control member in a first direction from said initial position to effect operation of said hydrostatic transmissions in the forward direction at the same speed and which is operated in response to operation of said control member in a second direction from said initial position to effect operation of said hydrostatic transmissions in the reverse direction at the same speed, a second actuator link which is operated in response to operation of said control member in a third direction to effect a change in the speed of said one hydrostatic transmission relative to said other hydrostatic transmission only when said control member is displaced in either said first or second direction from said initial position and a third actuator link which is operated in response to operation of said control member in a fourth direction to effect a change in the speed of said other hydrostatic transmission relative to said one hydrostatic transmission only when said control member is displaced in either said first or second direction from said initial position.

20. Apparatus as set forth in claim 19 wherein said mechanical linkage means further comprises first linkage means for operatively connecting said mechanically interconnected links with said one hydrostatic transmission and second linkage means for operatively connecting said mechanically interconnected links with said other hydrostatic transmission, and said mechanically interconnected links of said mechanical linkage means further comprises a first connector link interconnecting said second actuator link and said first linkage means and a second connector link interconnecting said third actuator link and said second linkage means, said second actuator link and said first connector link being pivotal about a first axis in response to movement of said control member in said third direction when said control member is in said initial position in such a manner that said second actuator link is ineffective to operate said first linkage means to change the speed of said one hydrostatic transmission relative to said other hydrostatic transmission, said third actuator link and said second connector link being pivotal about a second axis in response to movement of said control member in said fourth direction when said control member is in said initial position in such a manner that said third actuator link is ineffective to operate said second linkage means to change the speed of operation of said other hydrostatic transmission relative to said one hydrostatic transmission.

21. Apparatus as set forth in claim 20 wherein said second and third actuator links are pivotally mounted on said first actuator link and operation of said first actuator link in response to movement of said control member in either said first or second directions pivots said second and third actuator links about a third axis to actuate said first and second linkage means through said first and second connector links to effect a change in the speed of operation of said hydrostatic transmissions.

22. Apparatus as set forth in claim 19 wherein said linkage means further comprises first connection means operatively interconnecting said second actuator link and said control member for enabling said control member to effect actuation of said second actuator link upon operation of said control member in said third direction after operation of said control member in either said first or said second direction from said initial position and for rendering said control member ineffective to actuate said second actuator link upon operation of said control member in said fourth direction after operation of said control member in either said first or said second direction from said initial position, and second connection means operatively interconnecting said third actuator link and said control member for enabling said control member to effect actuation of said third actuator link upon operation of said control member in said fourth direction after operation of said control member in either said first or second direction from said initial position and for rendering said control member ineffective to actuate said third actuator link upon operation of said control member in said third direction after operation of said control member in either said first or said second direction from said initial position.

23. Apparatus as set forth in claim 19 further including means for retaining said first actuator link in an operated condition corresponding to a selected speed of operation of said hydrostatic transmissions in either the forward or reverse directions and enabling said second and third actuator links to be operated upon operation of said control member in either said third or fourth direction to vary the speed of said hydrostatic transmissions relative to each other.

24. In an apparatus for controlling the operation of a plurality of hydrostatic transmissions, said apparatus including a first actuator link having an initial position, a second actuator link operatively connected to said first actuator link and one of said hydrostatic transmissions, a third actuator link operatively connected to said first actuator link and to another of said hydrostatic transmissions, first actuator means for operating said first actuator link in a first direction from the initial position to operate said second and third actuator links and thereby effect operation of said hydrostatic transmissions in a forward direction at substantially the same speed which is variable by varying the extent of operation of said first actuator link in said first direction and for operating said first actuator link in a second direction from the initial position to operate said second and third actuator links and thereby effect operation of said hydrostatic transmissions in a reverse direction at substantially the same speed which is variable by varying the extent of operation of said first actuator link in said second direction, and second actuator means operable in a first direction, and second actuator means operable in a first direction from an initial condition for operating said second actuator link to vary the speed of said one hydrostatic transmission relative to said other hydrostatic transmission and operable in a second direction from an initial condition for operating said third actuator link to vary the speed of said other hydrostatic transmission relative to said one hydrostatic transmission, the improvement which comprises connector means operatively interconnecting said second actuator means and said second and third actuator links for enabling said second actuator means to operate said second actuator means to operate said second actuator link upon operation of said second actuator means in the first direction from its initial condition to vary the speed of said one hydrostatic transmission while maintaining substantially constant the speed of said other hydrostatic transmission and for enabling said second actuator means to operate said third actuator link upon operation of said second actuator means from in the second direction from its initial condition to vary the speed of said other hydrostatic transmission while maintaining substantially constant the speed of said one hydrostatic transmission.

25. Apparatus as set forth in claim 24 further comprising a single-control member movable in a plurality of directions for effecting operation of said first and second actuator means.

26. Apparatus for controlling the operation of a plurality of hydrostatic transmissions for driving a vehicle to thereby control the speed and direction of movement of the vehicle, said apparatus comprising a single-control member operable in a plurality of directions relative to an initial position to vary the speed and direction of operation of said hydrostatic transmissions to thereby vary the direction and speed of forward, forward-turning, reverse and reverse-turning movement of the vehicle, and mechanical linkage means comprising a plurality of mechanically interconnected links for effecting operation of said hydrostatic transmissions to vary the speed and direction of forward, forward-turning, reverse and reverse-turning movement of the vehicle in a manner which corresponds directly to the direction of operation of said control member, said mechanical linkage means comprising,
first and second actuator links mounted for pivotal movement about a common axis,
first and second connector rods pivotally connected to said first and second actuator links respectively for actuation thereby upon movement thereof,
the pivotal connection between said first actuator link and said first connector rod and said second actuator link and said second connector rod lying on said common axis when said control member is disposed in said third direction from said initial position,
said pivotal connection moving off of said common axis when said control member is disposed forwardly or reversely from said initial position.

27. Apparatus as set forth in claim 26 wherein said control member is a joystick.

28. Apparatus as set forth in claim 26 wherein said control member is a T-handle.

29. Apparatus as set forth in claim 26 wherein said control member has an initial position said mechanical linkage effects the operation of said hydrostatic transmissions to interrupt the vehicle drive, said control member being operable in a plurality of directions from said initial position while maintaining the vehicle drive in an interrupted condition.

30. In an apparatus for controlling the operation of a plurality of hydrostatic transmissions, said apparatus comprising a first actuator link having an initial position, a second actuator link operatively connected to said first actuator link and one of said hydrostatic transmissions, a third actuator link operatively connected to said first actuator link and to another of said hydrostatic transmissions, first actuator means for operating said first actuator link in a first direction from the initial position to operate said second and third actuator links and thereby effect operation of said hydrostatic transmissions in a forward direction at substantially the same speed which is variable by varying the extent of operation of said first actuator link in said first direction and for operating said first actuator link in a second direction from the initial position to operate said second and third actuator links and thereby effect operation of said hydrostatic transmissions in a reverse direction at substantially the same speed which is variable by varying the extent of operation of said first actuator link in said second direction, and second actuator means operable in a first direction from an initial condition for operating said second actuator link to vary the speed of said one hydrostatic transmission relative to said other hydrostatic transmission and operable in a second direction from an initial condition for operating said third actuator link to vary the speed of said other hydrostatic transmission relative to said one hydrostatic transmission, the improvement which comprises:

said second and third actuator links being pivotally connected with said first actuator link and being rotatable about a first axis under the influence of said first actuator link upon operation of said first actuator means,
said second actuator link being pivotable about a second axis upon operation of said second actuator means in the first direction from its initial position, and said third actuator link being pivotable about the second axis upon operation of said second actuator means in the second direction from its initial position.

31. In an apparatus for controlling the operation of a plurality of hydrostatic transmissions, said apparatus comprising a first actuator link having an initial position, a second actuator link operatively connected to said first actuator link and one of said hydrostatic transmissions, a third actuator link operatively connected to said first actuator link and to another of said hydrostatic transmissions, first actuator means for operating said first actuator link in a first direction from the initial position to operate said second and third actuator links and thereby effect operation of said hydrostatic transmissions in a forward direction at substantially the same speed which is variable by varying the extent of operation of said first actuator link in said first direction and for operating said first actuator link in a second direction from the initial position to operate said second and third actuator links and thereby effect operation of said hydrostatic transmissions in a reverse direction at substantially the same speed which is variable by varying the extent of operation of said first actuator link in said second direction, and second actuator means operable in a first direction from an initial condition for operating said second actuator link to vary the speed of said one hydrostatic transmission relative to said other hydrostatic transmission and operable in a second direction from an initial condition for operating said third actuator link to vary the speed of said other hydrostatic transmission relative to said one hydrostatic transmission, the improvement which comprises:

a first connector link operatively connected with said second actuator link, first linkage means pivotally connected to said first connector link for operatively connecting said first connector link and said second actuator link with said one hydrostatic transmission, a second connector link operatively connected with said third actuator link, and second linkage means pivotally connected to said second connector link for operatively connecting said second connector link and said second actuator link with said other hydrostatic transmission, said pivot connection between said first connector link and said first linkage means being coaxial with a pivot connection between said second actuator link and said first actuator link when said first actuator link is in its initial position so that pivotal movement of said second actuator link under the influence of said second actuator means is ineffective to effect operation of said one hydrostatic transmission through said first connector link and said first linkage means, said pivot connection between said second connector link and said second linkage means being coaxial with a pivot connection between said third actuator link and said first actuator link when said first actuator link is in its initial position so that pivotal movement of said third actuator link under the influence of said second actuator means is ineffective to effect operation of said other hydrostatic transmission through said second connector link and said second linkage means.

* * * * *